Patented June 18, 1935

2,005,321

UNITED STATES PATENT OFFICE 2,005,321

DYESTUFFS OF THE ANTHRAQUINONEACRIDONE SERIES

Max Albert Kunz, Mannheim, and Erich Berthold and Karl Koeberle, Ludwigshafen-on-the-Rhine, Germany, assignors to General Aniline Works, Inc., New York, N. Y., a corporation of Delaware No Drawing. Application March 31, 1932, Serial No. 602,402. In Germany April 2, 1931

7 Claims. (Cl. 260—37)

The present invention relates to vat dyestuffs of the anthraquinoneacridone series and process of producing the same.

We have found that 4-amino-Bz2,3,5-trihalogenanthraquinone - 2,1(N) - benzacridones and their acyl derivatives are valuable vat dyestuffs since they have the property of equally dyeing viscose silk and cotton so that even dyeings on mixed fabrics from the said fibrous material are obtained therewith which dyeings exhibit good fastness properties.

The 4-amino-Bz2,3,5-trihalogenanthraquinone-2,1(N)-benzacridones are best prepared by heating Bz2,3,5 - trihalogenanthraquinone - 2,1(N) - benzacridones with strong nitric acid preferably in an inert organic solvent, such as nitrobenzene, and reducing the nitro compound thus obtained, for example by vatting or by means of sodium sulphide. The Bz2,3,5-trihalogenanthraquinone-2,1(N)-benzacridones used as initial material may be produced synthetically by condensation of 1-chloranthraquinone-2-carboxylic acid or an ester thereof with 1-amino-2,4,5-trihalogenbenzene or 1-chloranthraquinone with 2,3,5-trihalogen-6-aminobenzene-1-carboxylic acid or an ester thereof, and effecting ring closure to form the acridone ring according to customary methods. The said trihalogenanthraquinone-2,1(N)-benzacridones may also be prepared by treating anthraquinone-2,1(N)-benzacridone or its Bz3,5-dihalogen derivatives with halogen in acid solution, preferably sulphuric or chlorsulphonic acid solution and in the presence of a halogen transferrer.

The acylation of the 4-amino-Bz2,3,5-trihalogenanthraquinone-2,1(N)-benzacridones is preferably effected in an inert organic diluting medium, such as for example nitrobenzene, trichlorobenzene, pyridine, quinoline, xylene, naphthalene and the like, it may, however, also be carried out in the absence of such diluting media. Acid-binding agents may also be added to the reaction mixture, for example, tertiary bases and alkali metal salts of weak acids. Acylating agents which may be used for the purpose of the present invention are in particular the halides and anhydrides of organic, in particular aromatic, acids, such as for example the halides and anhydrides of benzoic acid and its substitution products, for example the alkyl-, alkoxy-, halogen-, cyan- and nitro substituted derivatives, further the said derivatives of α- and β-naphthoic acid, anthracene and anthraquinone carboxylic acids, thiazol carboxylic acids or of dicarboxylic acids of the benzene and naphthalene series. Furthermore, there may be used the said derivatives of diphenyl-, benzophenone-, diphenyl ether mono- and polycarboxylic acids. The acylation may, however, also be carried out with the halides and anhydrides of mono- and poly carboxylic acids of the aliphatic and hydroaromatic series.

The said 4-acylamino-Bz2,3,5-trihalogenanthraquinone-2,1(N)-benzacridones may, however, also be produced by synthetic methods, viz. by condensing 4 - acylamino-1-halogenanthraquinones with 2,3,5-trihalogen-6-aminobenzene-1-carboxylic acid or an ester thereof, or 4-acylamino-1-halogenanthraquinone-2-carboxylic acid or an ester thereof with 1-amino-2,4,5-trichlorbenzene, and effecting ring closure to form the acridones from the said condensation products according to known methods.

The 4 - acylamino-Bz2,3,5 - trihalogenanthraquinone-2,1(N)-benzacridones which are obtained in the aforedescribed manner in very good yields and a state of high purity may, if necessary, be further purified according to known methods, for example, by extraction with inert organic solvents, by recrystallization from such solvents, by revatting or treating their pastes with oxidizing agents, for example, alkali metal hypochlorite solutions, or by way of their sulphates. They dissolve in concentrated sulphuric acid to give usually orange solutions and dye cotton violet to blue to green blue to green gray shades from violet to violet blue vats.

The most valuable dyestuffs are those containing chlorine in the Bz2,3,5-positions, but the invention also comprises the corresponding bromo derivatives and such in which part of the said positions are occupied by chlorine and part by bromine.

The following examples will further illustrate the nature of the present invention but the invention is not restricted thereto. The parts are by weight.

Example 1

428 parts of Bz2,3,5-trichloro-anthraquinone-2,1(N)-benzacridone are slowly heated while stirring to between 80° and 85° C. in 4000 parts of nitrobenzene after the addition of 800 parts of 96 per cent nitric acid and kept at the said temperature for between 4 and 6 hours. After cooling, the reaction mixture is worked up in the usual manner. The 4-nitro-Bz2,3,5-trichloroanthraquinone-2,1(N)-benzacridone obtained in a practically theoretical yield forms red compact crystals, dissolves in concentrated sulphuric acid to give an orange solution and dyes cotton from a violet vat green gray shades of very good fastness.

Instead of reducing the nitro compound by vatting it may also be reduced by means of sodium sulphide. The amine is a violet black powder.

Example 2

44 parts of 4-amino-Bz2,3,5-trichloroanthraquinone-2.1(N)-benzacridone are heated to boiling while stirring in 460 parts of nitrobenzene with 20 parts of benzoyl chloride until unchanged initial material cannot anymore be detected which may be recognized from the fact that a sample does not anymore yield blue gray, but pure blue dyeings. The reaction mixture is then allowed to cool and the reaction product separated in the form of dark violet crystals filtered off. It dissolves in concentrated sulphuric acid to give an orange solution and dyes cotton from a blue violet vat clear blue shades of excellent fastness to chlorine, light and atmospheric influences and is particularly suitable for printing purposes.

The 4-parachlorbenzoyl-amino-Bz2,3,5-trichloroanthraquinone-2,1(N)-benzacridone have similar properties, it yields, however, blue shades having a slightly more reddish tinge. The acylation by means of anthraquinone-2-carboxylic acid yields a reaction product dyeing gray blue shades of excellent fastness.

When using 4-amino-Bz2-bromo-Bz3,5-dichloroanthraquinone-2,1(N)-benzacridone (obtainable from the Bz2-bromo-Bz3.5-dichloroanthraquinone-2,1(N)-benzacridone in the manner described in Example 1) as initial material instead of the corresponding trichloro derivatives a reaction product is obtained dyeing gray green shades.

The acylamine prepared from 4-amino-Bz2,3,5-trichloroanthraquinone-2,1(N)-benzacridone and oxalyl chloride dyes cotton blue shades; the reaction products obtained by means of the chlorides of terephthalic-, isophthalic, diphenylcarboxylic, naphthoic, naphthalene-1,5-dicarboxylic and anthraquinonebenzacridone carboxylic acids dye cotton violet to blue to green blue shades.

Example 3

440 parts of 4-amino-Bz2,3,5-trichloroanthraquinone-2,1(N)-benzacridone are heated to boiling for a short time in 5000 parts of nitrobenzene with 400 parts of paramethoxybenzoyl chloride. After cooling, the reaction product is filtered off. The pure 4-paramethoxybenzoyl-amino-Bz2,3,5-trichloroanthraquinone-2,1(N)-benzacridone obtained in a very good yield dissolves in concentrated sulphuric acid to give an orange solution and dyes cotton from a violet blue vat blue very fast shades.

The corresponding paraethoxybenzoylamino derivative likewise dyes blue shades as does also the acylamine produced by means of meta-nitroparamethylbenzoyl chloride.

Violet shades are obtained with the products obtained by means of 2,5-dichlorobenzoyl chloride and metachlorobenzoyl chloride.

Example 4

44 parts of 4-amino-Bz2,3,5-trichloroanthraquinone-2,1(N)-benzacridone are heated to boiling while stirring in 220 parts of acetic acid anhydride until unchanged initial material cannot anymore be detected and a sample dyes blue shades fast to chlorine. The reaction mixture is then allowed to cool and the separated product filtered off. It dissolves in concentrated sulphuric acid to give an orange solution and dyes cotton clear blue shades of good fastness properties from a violet vat.

In an analogous manner the acylation by means of succinyl chloride, malonyl chloride, propionyl chloride and other halides or anhydrides of aliphatic carboxylic acids may be carried out.

What we claim is:

1. Vat dyestuffs of the anthraquinoneacridone series corresponding to the formula

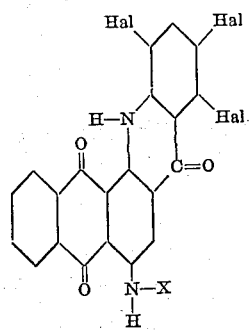

in which X stands for a hydrogen atom or —OC—R, R being a radicle of the benzene series, which dyestuffs dissolve in concentrated sulphuric acid to give usually orange solutions and dye cotton violet to blue to green blue and green grey shades.

2. The vat dyestuff of the anthraquinoneacridone series corresponding to the formula:

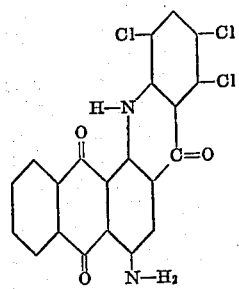

dissolving in concentrated sulphuric acid to give an orange solution and dyeing cotton from a violet vat green gray shades.

3. Vat dyestuffs of the anthraquinoneacridone series corresponding to the formula:

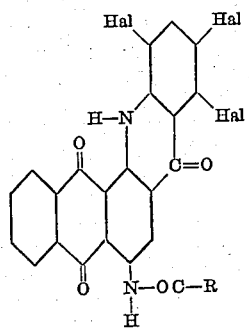

in which R stands for an aromatic radicle, which dyestuffs dissolve in concentrated sulphuric acid to give orange solutions and dye cotton violet to blue to green blue shades.

4. Vat dyestuffs of the anthraquinoneacridone series corresponding to the formula:

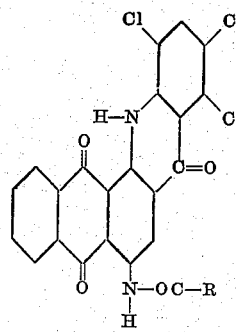

in which R stands for a radicle of the benzene series, which dyestuffs dissolve in concentrated sulphuric acid to give orange solutions and dye cotton violet to blue to green blue shades.

5. The vat dyestuff of the anthraquinoneacridone series corresponding to the formula:

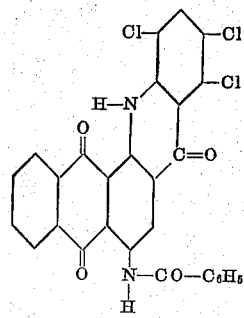

dissolving in concentrated sulphuric acid to give an orange solution and dyeing cotton from a blue violet vat blue shades.

6. Vat dyestuffs of the anthraquinoneacridone series corresponding to the formula:

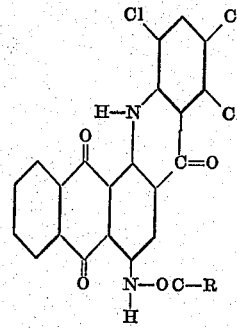

in which R stands for a radicle of the benzene series substituted by an alkoxy group, which dyestuffs dissolve in concentrated sulphuric acid to give orange solutions and dye cotton from violet blue vats blue shades.

7. The vat dyestuff of the anthraquinoneacridone series corresponding to the formula:

dissolving in concentrated sulphuric acid to give an orange solution and dyeing cotton from a blue violet vat blue shades.

MAX ALBERT KUNZ.
ERICH BERTHOLD.
KARL KOEBERLE.